Sept. 12, 1967 O. E. SAARI 3,341,729

DEVICE FOR LATERALLY SHIFTING ONE OF A PLURALITY OF ELECTRON BEAMS RELATIVE TO THE REMAINDER IN A COLOR TELEVISION TUBE

Filed Jan. 26, 1966 2 Sheets-Sheet 1

INVENTOR.
Oliver E. Saari

BY Michael Kozma
Robert W. Beart

His Att'ys

INVENTOR.
Oliver E. Saari
BY Michael Kovac
Robert W. Beart
His Att'ys

United States Patent Office 3,341,729
Patented Sept. 12, 1967

3,341,729
DEVICE FOR LATERALLY SHIFTING ONE OF A PLURALITY OF ELECTRON BEAMS RELATIVE TO THE REMAINDER IN A COLOR TELEVISION TUBE

Oliver E. Saari, Elmhurst, Ill., assignor to Illinois Tool Works Inc., Chicago, Ill., a corporation of Delaware Filed Jan. 26, 1966, Ser. No. 523,103
10 Claims. (Cl. 313—75)

ABSTRACT OF THE DISCLOSURE

Device for magnetically positioning a plurality of electron beams in a cathode ray tube and more specifically, an assembly of a plurality of pairs of magnets positioned equidistantly above and below a plane containing the red and green electron beams in a color television picture tube and pivotally movable for shifting the blue beam laterally without affecting the position of the red and green beams.

The present invention relates to a device which magnetically positions a plurality of electron beams in a cathode ray tube, and more particularly, to a beam correcting device for color television picture tubes, commonly known as a blue lateral and purifying magnet assembly, which provides the appropriate registration of the beams with respect to the image reproducing screen or face of a color television tube.

Commercial color television tubes employ three electron beams which are utilized to excite a phosphor screen containing an array of closely spaced phosphor dots arranged in trios corresponding to the three electron beams. Red, green and blue phosphor dots are used, each of which is associated with one particular electron gun.

To obtain the desired color image on the screen corresponding to the picture transmitted from the television cameras, it is important that each respective electron beam excite only those dots of the phosphor screen which corresponds to the color associated with the projected beam. Thus, the blue beam should be prevented from striking those areas on the screen containing the red and green light emitting phosphors. An effective way of accomplishing this is to employ a perforated screen mask between the electron guns and the phosphor screen such that each beam can only strike its complementary color dot. By arranging the three beams and the phosphor dot trios in an equilateral triangular relationship, and by converging the larger beam triangle on the screen mask at a point where each selected color can be projected through a perforation of the screen which is associated with a complementary colored dot, appropriate registration of complementary beams and phosphor dots is achieved.

It will be understood that very precise positioning of the electron beams is necessary for each beam to excite its corresponding phospor dot. However, variations in beam registration are encountered by reason of manufacturing tolerances and extraneous magnetic fields. It is thus necessary to provide correction means for beam misregistration which occur between the beam and dot trios.

Where the beams have been shifted from their proper color centers, it is necessary to shift the beams in unison by a purifying magnet assembly or the like to position the beam in trios in the proper geometric pattern for accurate registration with the dot trios when converged. This convergence is accomplished by a deflection yoke assembly or the like which causes the beam trios to radially converge at or near the screen mask. In a practical sense, it is possible to coincide any two of the three beams at a designated point by the radial convergence assembly, but this does not provide complete convergence necessary for beam-dot registration.

It has thus been necessary to provide an additional correcting device which laterally shifts the third beam relative to the two beams converged by the radial converging assembly. It has become common practice to shift the blue beam laterally of the converged red and green beams in either direction, and of a specified magnitude, and thus devices accomplishing such functions have become known as blue lateral shift or lateral-converging devices.

In the past, such blue lateral shift or lateral-converging devices have generally taken the form of a pair of rotatably mounted annular rings encircling the cathode ray tube neck, and having a plurality of discrete magnetic poles at a plurality of circumferentially spaced positions. The direction of rotation of the rings with respect to one another (from a zero or null point where they are magnetically shunted) determines the direction of the magnetic correction, and the degree of rotation determines the strength of the magnetic field, the combination thereof effecting lateral convergence of the blue beam with the converged red and green beams. While such devices have served well for the purposes intended, they are expensive and require complex mounting structures for the magnets which may result in additional variations. Additionally, it has been found difficult to place uniform magnetic fields at a plurality of discrete points, whether the magnets be of the annular variety or otherwise, and this will affect the uniformity and quality of the magnetic correction.

Accordingly, it is an object of the present invention to provide a new and improved beam focusing or correcting device which overcomes the aforementioned difficulties.

It is a further object of the present invention to provide a device which is readily mounted on the neck of a cathode ray tube, and which produces lateral or transverse shifting of a longitudinally directed electron beam to a desired direction and degree.

More particularly, it is an object of the present invention to provide an improved form of blue lateral shift or lateral-converging device for color television tubes enabling extremely precise positioning of the blue beam with respect to the converged red and green beams without disturbing the latter beams.

Yet another object of the present invention is the provision of a device of the aforenoted type which, in addition to the above objects, permits magnets of uniform field strength to be used in conjunction with one another while at the same time establishing a relatively weak magnetic field which accomplishes the shifting of the blue beam, but with very little defocusing of the electron beams themselves.

A still further object of the present invention is the provision of a blue lateral shift or lateral-converging device which is relatively simple, inexpensive, and capable of precise and accurate adjustment.

Still another object of the present invention is the provision of a blue lateral shift or lateral-converging device of the aforementioned type which can be used in conjunction with a purity magnet assembly for color television tubes.

These and other objects and advantages of the present invention are made possible, in accordance with the present invention, by the provision of a symmetrical magnetic pole arrangement which is positioned on the neck of a color television ray tube, and moved in a specific way to obtain lateral movement of the blue electron beam while leaving the red and green electron beams relatively undisturbed.

A specific description of the present invention will become apparent when read in connection with the accompanying drawings wherein.

Figures 4, 5, 6, 7, 8:
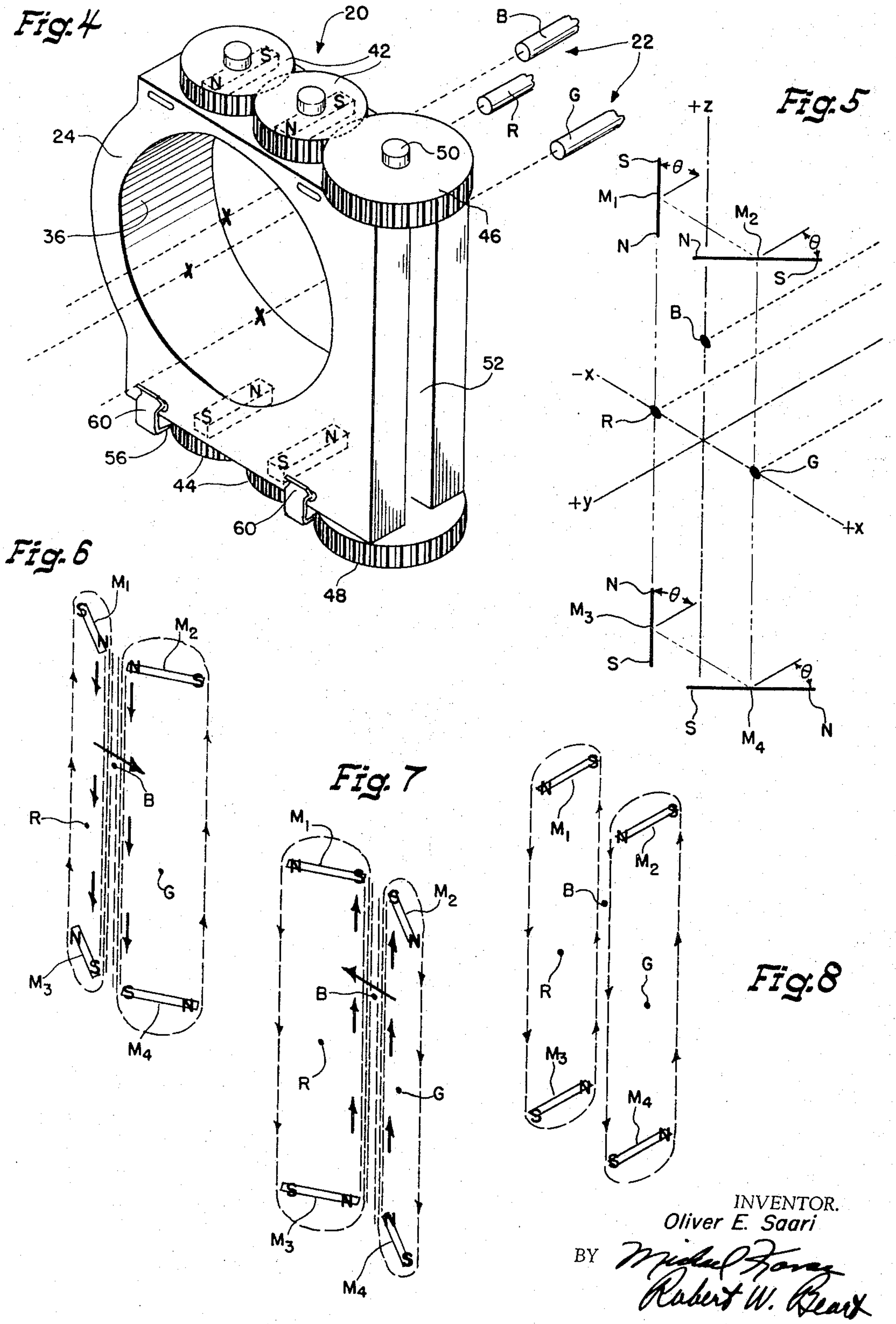
FIG. 4 is a perspective view of the blue lateral shift or lateral-converging portion of the beam correction device, and showing fragmented electron guns emitting electron beams in a prescribed fashion with respect to the blue lateral shift or lateral-converging device.
FIG. 5 is a diagrammatic representation showing one predetermined position of the magnetic pole means, forming a part of the blue lateral shift or lateral-converging device, with respect to an XYZ coordinate system.
FIG. 6 is a diagrammatic representation illustrating the magnetic field pattern established with the magnetic pole means in one predetermined position, and showing the relative transverse shifting of the blue beam in a given direction.

FIG. 7 is also a diagrammatic representation similar to FIG. 6 showing the magnetic pole means in a similar, but opposite position with respect to one another so as to depict the reverse magnetic field and consequent opposite shifting of the blue beam in comparison with the movement shown in FIG. 6 of the drawings; and FIG. 8 is a diagrammatic representation showing the magnetic pole means in parallel relationship to one another where they will have a null effect on the electron beams.

Figure 1:
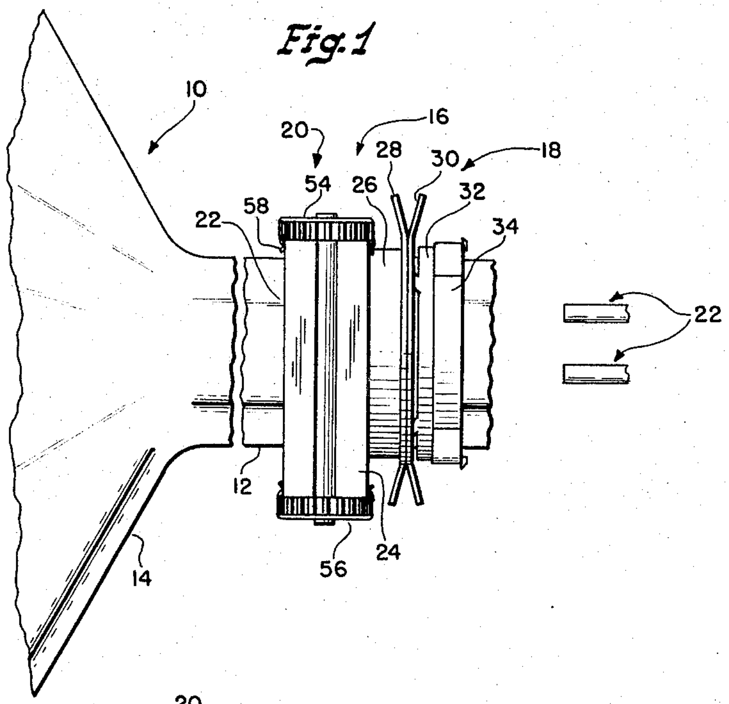
FIG. 1 is a fragmentary side elevational view of the beam correcting device of the present invention in place on the neck of a cathode ray tube.

Referring now in greater particularity to the drawings, and first to FIG. 1, a color television or cathode ray tube 10 is shown having a neck 12 and a flared bulb portion 14. A blue lateral and purity magnet assembly generally represented by the numeral 16 is mounted on the neck 12 of the tube 10, and consists of a purifying magnet device 18 and the blue lateral shift or lateral-converging device 20.

While the present invention is primarily concerned with the blue lateral shift or lateral-converging device 20, it is to be understood that it finds specific use in combination with a purifying magnet assembly 18 as shown in FIG. 1. The type of purifying magnet assembly to be used with the blue lateral shift or lateral-converging device of the present invention may be varied as desired. One preferred example is shown in detail in patent application Ser. No. 457,084, filed May 19, 1965 in the name of Robert R. Melone and assigned to the same assignee of the present invention which will be discussed hereinafter.

Associated with the cathode ray tube 10 is a plurality of three electron guns which are located adjacent the free end of the tube neck 12, and are arranged in an equilateral triangular relationship. In FIG. 1, only two of the three electron guns are shown, but FIG. 4 illustrates the use of three guns in the preferred equilateral arrangement. It will be understood that each of the guns includes means which will emit an electron beam in a path which is parallel to the other beams and the longitudinal axis of the tube neck. The three beams are acted upon by a radial convergence assembly (not shown) which causes the beams to converge in the vicinity of a screen mask (not shown) having openings therethrough enabling the beam to be selectively deposited on corresponding light emitting phosphor dots of a phosphor screen (not shown) adjacent the viewing face or screen (not shown) of the cathode tube. In this way, each respective beam is capable of exciting only the phosphor dots of the same color. Conventional means, in the form of horizontal and vertical deflection yokes (not shown), are employed for effecting the desired raster scanning pattern of the electron beams to obtain the desired color image on the viewing screen corresponding to the picture transmitted from the television camera.

Although such a system functions effectively to provide an acceptable color picture, it has been found that manufacturing variations and extraneous magnetic fields have a pronounced effect on beam positionment resulting in poor focus and loss of color purity. The phosphor dots are positioned on the phospher screen in a smaller, but equilateral triangular relationship corresponding to the positionment of the electron guns; however, manufacturing tolerances make it difficult to position the electron gun structures in the tube neck in such a manner that their color centers will accurately coincide, when radially converged, with each trio of phosphor dots arranged on the phosphor screen. This results in the electron beams striking phosphor dot areas other than those for which it is necessary to provide the intended color purity. Furthermore, various magnetic influences such as stray fields may have an effect on beam positionment.

Accordingly, it is necessary to provide beam positioning or correction devices which compensate for beam misregistration. The blue lateral and purifying magnet assembly 16 shown in FIG. 1 of the drawings, is designed to produce the necessary shifting of the beams for appropriate dot registration. Where the beams are non-aligned with their proper geometric or color centers, the purifying magnet assembly 18 will shift the beams in a desired direction and magnitude whereas the blue lateral shift or lateral converging device 20 makes it possible to converge the blue electron beam with the red and green beams which have been brought to a point by a radial convergence assembly (not shown).

The assembly 16 includes a housing 22 which is preferably of a molded plastic material, polycarbonate being one preferred example, so as to have no electrical or magnetic effect on the electron beams. Housing 22 is subdivided into two portions including a base portion 24 upon which the blue lateral shift or lateral-converging device 20 is mounted, and a rearwardly extending portion in the form of an annular body 26 which provides support for the purifying magnet assembly 18.

As previously discussed, the purifying magnet assembly 18 is preferably of the type shown in the aforementioned patent application Ser. No. 457,084 which includes a pair of annular steel rings 28, 30 which are held in place on the annular body 26 by a molded plastic retainer 32 having suitably configured laterally extending flanges which bear against ring 30 and resiliently hold the rings in abutting relationship by virtue of the inherent resiliency of the plastic material from which the retainer is made. This construction will permit desired positioning of the rings without interfering with circumferential adjustment thereof.

Each of the annular rings 28, 30 is provided with a plurality of circumferentially spaced magnetic poles in an identical arrangement, the north and south magnetic poles thereof being on axially opposite sides. The magnetic poles of the rings 28, 30 are magnetically shunted when the opposite poles on each of the two rings are aligned with respect to one another so as to produce a minimum magnetic field across the interior of the rings. By rotating the rings relative to one another, and by rotating the rings together in combination, the proper motion and direction is given to the electron beams to position them on their proper color or geometric centers to compensate for beam misalignment.

Before considering the blue lateral shift or lateral-converging device 20, it will be noted that the assembly 16 includes a cylindrical clamp member 34 which acts upon part of the annular body portion 26, as discussed in detail in the aforementioned patent application, to fixedly mount the assembly in position on the tube neck 12. The clamp 34 is of the split ring variety wherein an associated fastening member, preferably a screw threaded fastener, permits the circumferential contraction or expansion of the clamp for clamping and unclamping the assembly on the tube neck. As will be appreciated, this clamp ring 34 is merely representative of one type of clamping or fastening means which may be employed to secure the assembly in fixed position on the tube neck.

Figure 3:
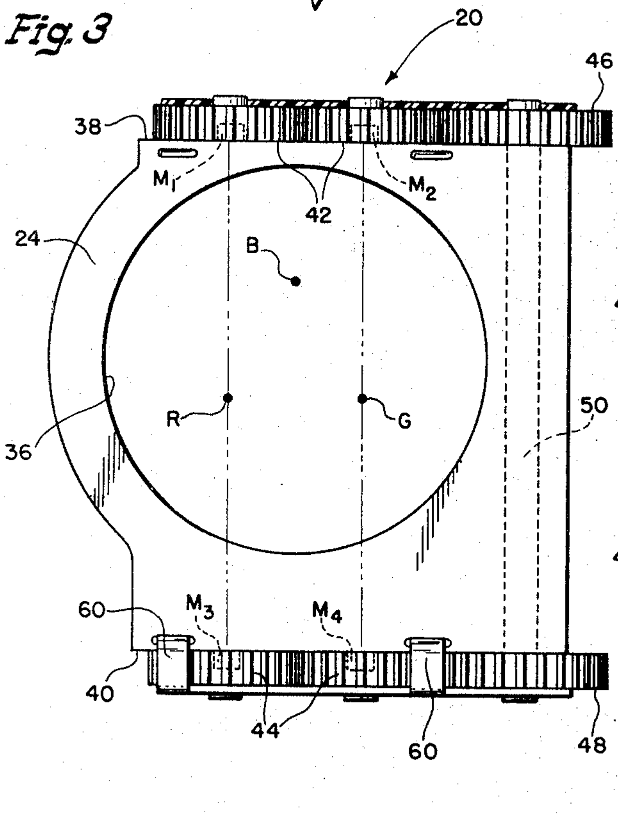
FIG. 3 is a front elevational view of the beam correcting device and on the same scale as FIG. 2.
Figure 2:
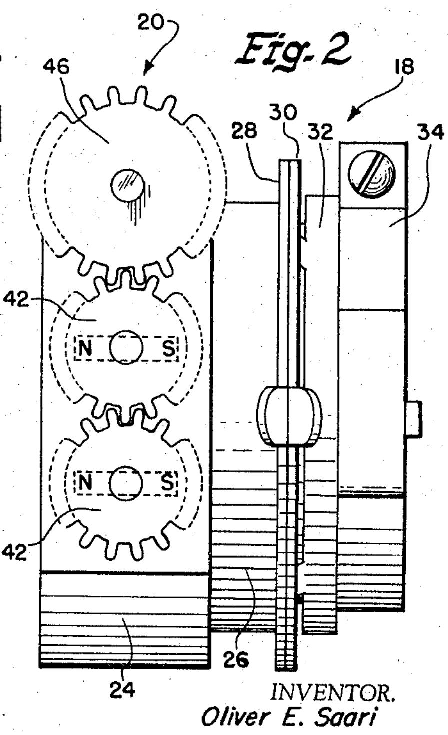
FIG. 2 is a top plan view of the beam correcting device shown in FIG. 1 on an enlarged scale.

Referring now to the blue lateral shift or lateral-converging device 20, as best illustrated in FIGS. 2–4 of the drawings, it will be seen that the base 24 of the housing 22 includes a sizable through opening 36, as would be the case of rearward annular extension 26, to receive the neck 12 of the cathode ray tube. The upper and lower exterior faces 38, 40 respectively of the base 24 are substantially planar to permit a plurality of upper and lower gears or other suitable mechanical driving means thereon. In this connection, it is to be understood that while gears are preferred because they impart precise, unvarying movement as compared with other mechanical drivers, any suitable means may be employed to obtain the desired movement as will be discussed hereafter. Each of the upper and lower plurality of gears consists of a pair of identical spur gears which mesh together, at least one of the spur gears being engaged by a spur phasing gear. The upper and lower pairs of identical spur gears are identified 42, 44 respectively, and the upper and lower phasing gears which cooperate therewith are identified 46, 48 respectively. Each of the identical sets or pairs of spur gears 42, 44 are rotatably mounted by suitable stub shafts, either integral with the gears or extending from the base 24. The phase gears 46, 48 are suitably journalled on a connecting shaft 50 which is received within a slot 52, as best seen in FIG. 4, of the base 24. The upper and lower gear sets, which are preferably of a molded plastic material such as nylon so as to be non-magnetic in character, are held in place by non-magnetic plastic clips 54, 56 which have suitable apertures to receive the ends of the stub shafts associated with the gears 42, 44 and the ends of the connecting shaft 50. Each of the clips 54, 56 has a plurality of depending, resilient finger prongs 58, 60 respectively which engage the sides of the base 24 without interfering with the movement of the gears so as to prevent the gears from slipping off its respective shaft.

It will be understood that movement of the phasing gears 46, 48 in a predetermined direction, say clockwise, will impart an opposite or counterclockwise movement to the next adjacent spur gear which, in turn, drives the other spur gear in the same or clockwise direction as the phasing gears 46, 48. Further, it will be appreciated that simultaneous or synchronous movement of the spur gear pairs 42, 44 respectively is made possible by virtue of the equal movement imparted through the phasing gears 46, 48 commonly connected to shaft 50, and this is an important part of the present invention in the illustrated embodiment.

To obtain the proper adjustment of the blue beam with respect to the red and green beams in the neck of the cathode ray tube 10, each of the upper and lower pairs of identical spur gears 42, 44 respectively has embedded therein a magnetic pole means in the form of a bar magnet. The upper bar magnets are identified M1, M2 and the lower bar magnets are denominated M3, M4. Each of the magnets M1 through M4 are positioned closely adjacent one side face of the gears 42, 44 so as to be situated as close as possible to the through opening 36 when mounted on the base 24.

As shown in FIG. 3 of the drawings, the desired arrangement of the electron beams is illustrated, and there it will be seen that the blue, red and green beams, identified by letters B, R, and G, are arranged in an equilateral triangular relationship, each of the beams being equidistant from the longitudinal axis of the tube neck. The housing 24 is so constructed and the gears and magnets mounted thereon are so arranged that upper and lower magnets M1, M3, which are coplanar with each other, are aligned with and equidistant from the red beam R while magnets M2, M4, which are also coplanar with each other, are aligned with and equidistant from the green beam G. In this connection, it wil be noted that the lower part of the housing 24 is substantially thicker in a diametrical sense than the upper part of the housing so that the magnets M3, M4 are located the same distance from beams R and G as the magnets M1 and M2. Such an arrangement enables the magnets M1–M4 to be positioned and moved in a specific way to be described hereafter for obtaining the lateral movement of the blue beam B without effecting the red and green beams R, G respectively.

The shifting of the blue beam is accomplished by establishing a transverse magnetic field relative to the blue beam to, in turn, result in a movement of the blue beam laterally of the red and green beams. This transverse magnetic field is created, in accordance with the principles of the present invention, by orienting the north and south magnetic poles of each pair of magnetic pole means in a specific manner and thereafter shifting the magnetic pole means in a prescribed fashion. More specifically, the north magnetic poles of magnetic pole means M1, M2 are arranged to face each other in confronting relationship, and are aligned with the south magnetic poles of magnetic pole means M3, M4 which are also facing each other in confronting relationship. Likewise, the north magnetic poles of magnets M3, M4, while facing each other in confronting relationship, will be aligned with the south magnetic poles of magnets M1, M2. This is readily depicted in the FIGURE 4 perspective of the blue lateral shift device.

Each of the upper and lower pairs of magnetic pole means M1, M2 and M3, M4 respectively are mounted on the base 24 for movement relative to one another about a vertical axis passing through its center, preferably though not necessarily through the disclosed gear train arrangement. When so moved, the north and south magnetic poles of adjacent magnets will repel one another to a degree, while the upper and lower north and south magnetic poles will yield a combined effect establishing a transverse magnetic field substantially normal to the blue electron beam to effect transverse or lateral shifting thereof relative to the red and green beams.

The preferred initial setting of each upper and lower pair of magnetic pole means is a parallel relationship, that is, the upper pair of magnetic pole means M1, M2 are parallel to each other as are the lower pair of magnetic pole means M3, M4. This is the position of the magnetic pole means where they will not affect any of the beams, and will hereinafter be referred to as the null setting.

The manner of establishing the transverse magnetic field and its direction will be readily understood by a comparison of FIGS. 5–8. Attention is first directed to FIG. 5 of the drawings for a description of the relative location of each of the magnetic pole means M1–M4 in a three dimensional or XYZ coordinate system. The red and green beams are parallel to the Y axis, which is spaced downwardly from the longitudinal axis of the tube as shown in FIG. 3, and intersect the X axis at points generally equidistant from the zero point. The blue beam B is also parallel to the Y axis, but crosses the Z axis, rather than the X axis. The desired arrangement of the blue, red and green beams, where they would intersect their geometric or color centers, is as illustrated in FIG. 5. Deviations from this arrangement due to extraneous magnetic fields and manufacturing tolerances can be corrected or compensated by the symmetrical arrangement and movement of the magnets M1–M4 with respect to the electron beams.

As previously discussed, the desired arrangement takes the form of magnets M1 and M3 being generally aligned with and equidistant from the red beam R, while magnets M2 and M4 are aligned with the green beam G as well as being equidistant therefrom. When the magnets are moved from the null setting or position where they are parallel with each other through an angle $\theta$ as shown in FIG. 5, thereby bringing one pair of like poles on one pair of magnetic pole means toward each other for cooperation with opposite poles of like character on the other pair of magnetic pole means, a transverse magnetic field will be established substantially normal to the path of the blue beam B so as to effect lateral shifting thereof with respect to the red and green beams R, G respectively in accordance with the well known principle that a magnetic field will exert a force on a current carrying conductor such as a beam of electrons which is substantially perpendicular to the magnetic field. The blue beam will be shifted or deflected toward the $+X$ or $-X$ direction as shown in FIG. 5 depending upon the direction of the angle $\theta$ from the null position.

Upon reflection, it will be apparent that the amount and direction of the beam deflection depends on the magnetic field component in the plane perpendicular or normal to the beam. The amount of deflection depends on the magnitude of this component and the distance the beam traverses the field, while the direction of the deflection will be at right angles to the component. In contrast, the component of the magnetic field which is parallel to the beam is not properly aligned to deflect the beam. Further, due to the symmetry of the magnetic pole means with respect to the vertical plane passing through the longitudinal axis of the tube neck, the horizontal component of the field vanishes identically at every point in the vertical plane. Thus, any beam in the vertical plane parallel to a horizontal plane passing through the longitudinal tube neck axis is not deflected in the vertical direction at all, regardless of the value of $\theta$.

A pictorial representation of the above discussed principles is illustrated in FIGS. 6–8 of the drawings. FIG. 8 shows magnets M1–M4 in their null setting ($\theta=0$) where they are parallel to each other. The arrangement establishes a combined magnetic field between the north and south magnetic poles of each magnet as well as the north and south magnetic poles of vertically spaced magnets M1, M3 and M2, M4. The vertical component of the magnetic field vanishes on the line of intersection of the vertical plane passing through the longitudinal tube neck axis, and the plane passing through the center lines of the magnetic pole means. This line of intersection generally coincides with the Z axis in FIG. 5 of the drawings, ahead and behind this line, in the vertical plane, the vertical component of the magnetic field does not vanish, but it is easy to see that, due to the antisymmetric arrangement of the poles on opposite sides of the horizontal plane, the net angular deflection of the beam in the horizontal direction is zero as it traverses the entire magnetic field. In other words, as the beam enters the magnetic field, it may be slightly horizontally deflected, but this will be countered by an equal and opposite movement as the beam leaves the field so as to result in a net zero deflection.

When the north poles of magnet M1, M2 and the south poles of magnets M3, M4 are moved laterally toward each other as viewed in FIG. 6, a relatively strong, vertically oriented magnetic field, directed from the upper north to the lower south poles, will be established as indicated by the dark arrow lines in FIG. 6. This magnetic field is transverse to and intersects the path of the blue beam B so as to result in a lateral shifting thereof in a direction toward the right as viewed in FIG. 6. A similar, but reversely directed magnetic field is created when the south magnetic poles of magnets M1, M2 are moved laterally toward one another for cooperation with the north magnetic poles of magnets M3, M4. In this case, the magnetic lines of force will flow from the lower north poles of magnets M3, M4. As a result, the blue electron beam B will be laterally shifted toward the left as viewed in FIG. 7 to effect the blue beam shift.

Thus, by moving the magnets as shown in FIGS. 6–7, the blue beam B can be shifted either to the right or to the left with respect to the red and green beams R, G. The magnitude of the shift is determined by the strength of the magnetic field between magnets M1, M2 and M3, M4 and this can be increased or decreased by enlarging or reducing the angle $\theta$ from the null setting. The greater the angle $\theta$ from the null setting, the greater the magnetic field will be, and vice versa.

In the contemplated arrangement, opposite ends of magnets M1, M2 above the horizontal tube neck axis as well as magnets M3, M4 therebelow will be spaced apart or moved closer together. This will have the effect of strengthening the vertical components of the field as the like poles of magnets M1, M2 and M3, M4 are moved towards one another, while weakening the vertical field components where the like poles of the magnets are moved farther apart. Furthermore, the symmetrical pole arrangement of the present invention, where the beam to be shifted is equidistant from the pole means in the null position, will result in a doublefold effect in the vertical field components. The spread apart and the close together poles will respectively weaken and strengthen the vertical field components predetermined proportionate amounts so that the field strength at opposite ends thereof will be unequal. This difference in field strength is readily depicted by the concentration and number of arrow lines in FIGS. 6 and 7.

While the blue electron beam B can be shifted in the above described manner, there should be little, if any, shift of the red and green electron beams. In accordance with the teachings of the present invention, the red and green beams R, G respectively will be relatively undisturbed due to the desired symmetrical arrangement contemplated herein. More particularly, it will be understood that when the magnets are moved in the manner illustrated by FIGS. 6–7, each pair of upper and lower cooperating north and south magnetic poles of magnets M1, M3 in the case of the red beam R, or magnets M2, M4 in the case of green beam G, will be laterally offset therefrom equivalent amounts so as to impart equal and opposite forces on the respective beam which may result in some curvilinear or "snaking" movement of the beam. However, this will not affect its direction and magnitude. The effect of magnets M1, M3 on the non-aligned green beam G, and the effect of magnets M2, M4 on the non-aligned red beam R is practically negligible. While there may be a slight shift of each of the beams by the non-associated magnets, the shift will be in the same direction as the blue beam, and the amount will be substantially smaller due to the greater distances involved, thereby affecting the beams relatively little, if at all.

Simultaneous lateral movement of the magnets M1, M2 and magnets M3, M4 is obtained by the identical gear sets 42, 44 which are driven by the phasing gears 46, 48 respectively at each end of the common connecting shaft 50 in the illustrated embodiment. While such is the preferred movement of the magnets, it will be understood that the upper pair of magnets M1, M2 may be first moved into position followed by generally corresponding incremental movement of the magnets M3, M4. Sequential movement of the magnets will require changes in the driving train or motive system, and such is specifically contemplated herein. It will be further appreciated that the magnets may be manipulated manually into their desired positions, and in such a case it is only necessary to mount the magnetic pole means on the housing to permit relative movement of the like poles of adjacent positioned magnetic pole means toward and away from each other.

It will be recognized that manufacturing tolerances and the manual manipulation of the magnets may result in slightly unequal movements or positions of the upper and lower pairs of magnets. This will affect the uniformity and location of the magnetic field, and thus the degree of adjustment of the blue beam. However, as long as the cooperating north and south magnetic poles of the magnets are in substantial alignment with each other to result in a substantially symmetrical pole arrangement, it is possible to make the desired adjustments within specified limits.

In the preferred embodiment, each of the magnets M1–M4 preferably have an identical field strength, and are embedded in the plastic gears 42, 44. Various other magnetic arrangements are possible including riveting or otherwise securing individual magnets to non-magnetic gears or the like, the use of magnetic gears, the use of U-shaped magnets having the poles thereof corresponding to the position of the magnetic pole means illustrated herein, and the like. It is also conceivable that a plurality of magnets, of the same or dissimilar form and field strength, could be arranged in the vicinity of one or more of the four symmetrical locations to provide a combined field strength at each of such locations which would correspond in the same manner as each of the illustrated magnets do with respect to each other in the illustrated embodiment. Thus, the term "magnetic pole means" as used herein is intended to cover any and all forms of magnets or magnetic means in the contemplated arrangement.

From the foregoing it will now be appreciated that the present invention contemplates a new and improved blue lateral shift or lateral converging device which can be used separately or in conjunction with a purifying magnet assembly. The substantially symmetrical arrangement of the magnetic pole means in the blue lateral shift device provides a relatively uniform transverse magnetic field with respect to an electron beam which is just strong enough to effect the shifting thereof in a prescribed manner without adversely disturbing other closely situated electron beams. The effectiveness of the device coupled with its relative simplicity makes it ideal for adaption on commercial color television tubes.

The specific embodiment of the invention as herein shown and described will be understood as being for illustrative purposes only. Various changes in structure will no doubt occur to those skilled in the art, and will be understood as forming a part of the present invention insofar as they fall within the spirit and scope of the appended claims.

I claim:

1. A beam deflecting device for laterally and selectively shifting one of a plurality of generally longitudinally directed electron beams in a neck of a cathode ray tube, said beam deflecting device adapted to be mounted on the neck of said cathode ray tube and including opposite pairs of magnetic pole means positioned above and below a horizontal plane passing through the longitudinal axis of the tube neck and substantially equally spaced from the remainder of said plurality of electron beams and being substantially symmetrically arranged with regard to a vertical plane passing through said longitudinal axis, like poles of each pair of magnetic pole means arranged on the same side of said horizontal plane facing each other in confronting relationship and being aligned with opposite poles of like character on the other side of said horizontal plane, said magnetic pole means being mounted on said tube neck and being associated with means causing corresponding relative movement of like poles on the same side of said horizontal plane toward and away from each other for establishing a magnetic field substantially normal to said one electron beam and thereby effect transverse shifting thereof while maintaining the remainder of said electron beams in a region of substantially constant magnetic flux.

2. A beam deflecting device for laterally and selectively shifting one of a plurality of generally longitudinally directed electron beams, in a neck of a cathode ray tube, said beam deflecting device adapted to be mounted on the neck o fsaid cathode ray tube and including upper and lower pairs of magnetic pole means laterally offset a predetermined distance from the longitudinal axis of the tube neck, and substantially equally spaced from the remainder of said plurality of electron beams, each pair of upper and lower magnetic pole means being generally coplanar with each other and with one of said other pair of magnetic pole means to define a symmetrical pole arrangement, the coplanar upper and lower pairs of magnetic pole means having the like poles thereof facing each other in confronting relationship, each pair of confronting like poles on one side of said longitudinal axis positioned for cooperation with a pair of opposite poles of like character on the other side of said longitudinal axis, said upper and lower pairs of magnetic pole means being mounted for corresponding lateral movement toward and away from each other, and means for moving the cooperating like and opposite poles corresponding increments transversely of the longitudinal tube axis to establish a combined magnetic field generally perpendicular to the longitudinal tube axis for exerting a lateral shifting force on said one electron beam while maintaining the remainder of said electron beams in a region of substantially constant magnetic flux.

3. The beam deflecting device set forth in claim 2 wherein said last mentioned means includes means for simultaneously moving said upper and said lower pairs of magnetic pole means toward and away from each other.

4. The beam deflecting device as set forth in claim 2 wherein said upper and lower pairs of magnetic pole means are pivotally mounted on said tube neck.

5. The beam deflecting device as set forth in claim 2 wherein each of said upper and lower pairs of magnetic pole means comprises a pivotally mounted bar magnet which rotates about a vertical axis passing through its center.

6. The beam deflecting device as set forth in claim 5 wherein the upper and lower pairs of pivotally mounted bar magnets are simultaneously moved toward and away from each other by a common operator operatively connected thereto.

7. A beam defllecting device as set forth in claim 2 wherein each magnetic pole means comprises a bar magnet embedded in a molded plastic gear, each upper and lower pair of magnetic pole means having the gears thereof meshing with each other, and spaced phasing gears for cooperative meshing engagement with one of said upper and lower pair of gear means, said spaced phasing gears being operatively connected to a common shaft whereby rotative movement thereof causes simultaneously movement of said upper and lower pairs of gear means.

8. The beam deflecting device as set forth in claim 2 wherein each of said upper and lower pairs of magnetic pole means are mounted upon a non-magnetic base means adapted to receive the neck of said cathode ray tube, said base means having fastening means associated therewith for fixedly mounting said base means in position on said cathode ray tube neck.

9. The beam deflecting device as set forth in claim 8 wherein said non-magnetic base means includes an extended cylindrical drum portion facilitating the mounting of a pair of purifying magnets thereon.

10. For a cathode ray tube, a beam deflecting device for shifting a first electron beam relative to spaced second and third electron beams generally parallel with and equidistant from said first mentioned beam to arrange said beams in a predetermined equilateral triangular relationship relative to one another, said device comprising a generally opposed pair of magnetic pole means mounted above and below each of said second and third electron beams in general alignment therewith and equidistant therefrom, each of said upper and lower pairs of magnetic pole means being mounted for transverse movement about a vertical axis equidistant from its poles, like poles mounted above and below said second and third electron beams facing each other in confronting relationship and being aligned with opposite poles of like character on the other side of said longitudinal axis, and means for simultaneously moving the like magnetic poles of the upper and lower pairs of magnetic poles laterally toward each other to establish a magnetic field generally perpendicular to the first electron beam for exerting a force thereon in a direction generally perpendicular to said magnetic field and said first electron beam for proper positioning thereof relative to said second and third electron beams while maintaining said second and third electron beams in a region of substantially constant magnetic flux.

References Cited

UNITED STATES PATENTS 3,290,533 12/1966 Ammerman ---------- 313—77

DAVID J. GALVIN, *Primary Examiner.*

ROBERT SEGAL, *Examiner.*